United States Patent [19]
Lubke et al.

[11] 3,922,663
[45] Nov. 25, 1975

[54] SEISMIC HUMAN FOOTSTEP DETECTOR

[75] Inventors: Roger A. Lubke, Excelsior; Charles P. Varecka, Bloomington, both of Minn.

[73] Assignee: Honeywell Inc., Minneapolis, Minn.

[22] Filed: May 30, 1974

[21] Appl. No.: 474,753

[52] U.S. Cl. ............ 340/261; 307/117; 340/258 D
[51] Int. Cl.² .................................... G08B 13/22
[58] Field of Search .......... 340/261, 258 D, 258 R, 340/276; 307/117

[56] References Cited
UNITED STATES PATENTS

| | | |
|---|---|---|
| 3,717,864 | 2/1973 | Cook et al. .................. 340/258 D |
| 3,774,190 | 11/1973 | Kyle, Jr. ........................... 340/261 |
| 3,824,532 | 7/1974 | Vandierendonck ............... 340/261 |

*Primary Examiner*—Glen R. Swann, III
*Attorney, Agent, or Firm*—Albin Medved

[57] ABSTRACT

The apparatus includes logic for examining the signature of the signal received from a seismic sensor, for measuring the duration of the disturbances and the time interval between successive disturbances and for determining, on basis of such information, whether the disturbances are or are not caused by human footsteps.

4 Claims, 3 Drawing Figures

SEISMIC HUMAN FOOTSTEP DETECTOR

BACKGROUND OF THE INVENTION

1. Field of the Invention

The invention generally pertains to security systems designed to guard against intrusion of unauthorized personnel into a protected area. Particularly, the invention will find utility where the facility, structure, or other object for protection, is surrounded by a substantial area of open land. An example of a possible application of the invention would be as a security system for an airport or a military base.

2. Description of the Prior Art

The use of geophones discriminate. similar seismic sensing devices for detecting the intrusion of vehicles or personnel is well known in the prior art. To discriminate between different types of intruders, systems have been developed using complex banks of multibandpass filters. The complexity of such systems made them quite expensive. Attempts at simplification generally resulted in reduced capability to dixcrimintate.

In distinguishing a disturbance caused by a human footstep from other disturbances, it is necessary to determine parameters which are unique to the human footstep disturbance. For example, U.S. Patent No. 3,585,581 issued to Kenneth E. Aune recognizes that the frequency signatures characteristic of a walking man comprise a series of high frequency disturbances, whereas a disturbance caused by a vehicle has a more constant level frequency signature with significant amplitude in the lower frequency ranges. The discrimination between a walking human and a vehicle is achieved by comparison of the frequencies. U.S. Patent No. 3,261,009, to K. J. Stetten et al., recognizes that the signature produced by a walking human is a series of pulses which in general have a maximum pulse rate of 4 per second and not fewer than 4 per 6-second interval. It provides means for distinguishing between disturbances caused by human footsteps and other disturbances by application of these two criteria.

SUMMARY OF THE INVENTION

The invention described herein relates to a seismic personnel detector which is capable of identifying human footsteps. The seismic signature generated by a disturbance, such as a human footstep, is detected by means of a geophone and the characteristics of the signatures are examined. A footstep can be characterized by a series of on-off pulse-like disturbances. It has been found experimentally that, on the average, the presence of a footstep associated disturbance will not exceed a time duration of 250 milliseconds. In addition, a footstep is characterized by a dead time between successive footsteps which will characteristically be greater than 70 milliseconds. With rare exceptions, the successive footsteps will occur within a period of less than 1.6 seconds. The presence of a walking human is detected by comparing the seismic signatures to the time criteria mentioned above.

Accordingly, it is an object of the present invention to not only detect an intrusion, but be able to identify such an intrusion as one caused by a man or something other than man.

BRIEF DESCRIPTION OF THE DRAWINGS

Other objects, advantages and features of the present invention will appear in the accompanying drawings in which.

DESCRIPTION OF THE PREFERRED EMBODIMENT

Figure 1:
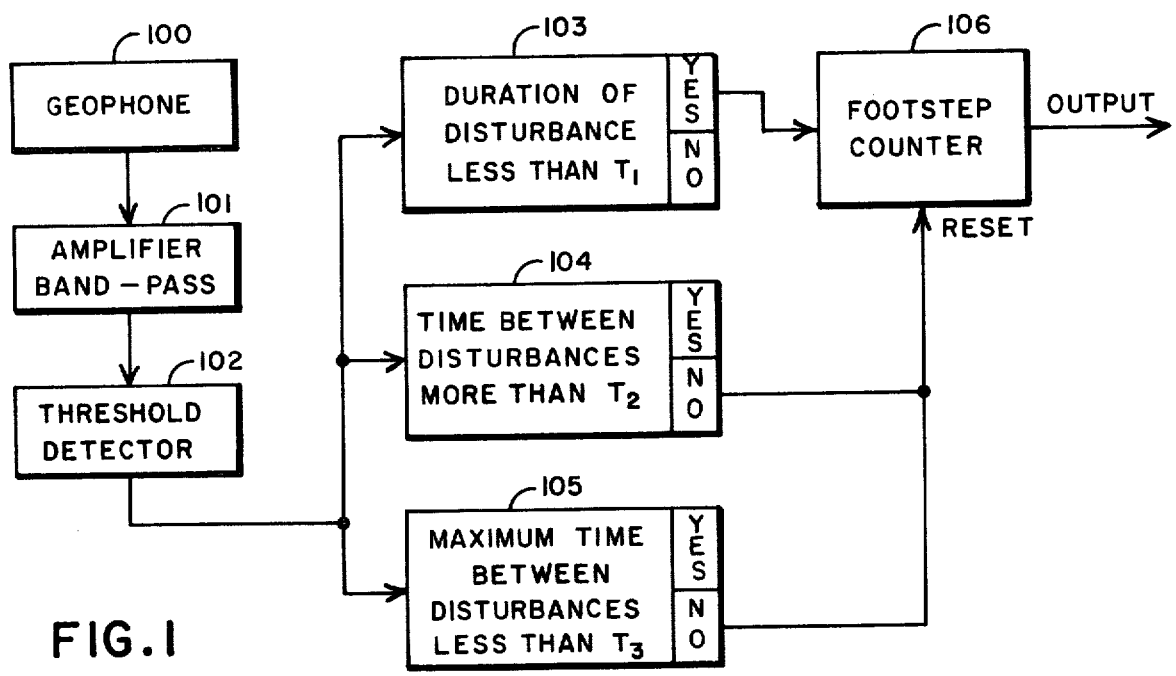
FIG. 1 is a schematic block diagram illustrating a preferred embodiment of a seismic human footstep detector according to the present invention.

In the preferred embodiment of FIG. 1, the seismic disturbances are sensed by a geophone 100 which converts the disturbances into an equivalent electrical signal. The signal provided at the output of the geophone is amplified to bring it to a practical level and sent through a band pass filter 101 having a frequency band pass of 10 to 70 Hertz. Upon amplification, the signal is sent through a threshold detector 102 whose function it is to distinguish a valid signal from the background noise.

The seismic signal is an amplitude/time varying signal. However, for the purposes of the operation of the apparatus described herein, amplitude variation is not an important component of information. WHat is significant is the duration of the disturbance itself and the time interval between successive disturbances. An envelope detector is provided to detect the envelope of the signal from the geophone and thereby ignore the short time amplitude variations. The threshold detector is also a high gain amplifier. Once the signal exceeds the predetermined threshold, the threshold detector remains in saturation for the entire duration of the disturbance and provides an output signal which is a square wave pulse whose duration corresponds to the duruation of the disturbance.

The signal from the output of the threshold detector is tested against three criteria. First, it is measured by timing logic 103 to see if it less than T1 (250 milliseconds in the preferred embodiment) long. If it is less than 250 milliseconds long, it is accepted as a possible footstep and a signal is sent by timing logic 103 to footstep counter 106 to register a count. If it is not less than T1, it is rejected as definitely not being generated by a footstep.

The second criteria applied is that footstep associated disturbances will generally not occur at a frequency greater than one every T2 (320 milliseconds in the preferred embodiment). The total time elapsed from the beginning of a disturbance to the beginning of the next disturbance is measured by timing logic 104 and if such time exceeds T2, the disturbance is conditionally accepted as a valid footstep. If the time elapsed is less than T2, the disturbance is rejected as not caused by a footstep and a signal is sent to reset footstep counter 106.

Finally, the time elapsed from the beginning of a disturbance to the beginning of the next succeeding disturbance is measured by timing logic 105. If it exceeds a third predetermined time period T3 (1.6 seconds in the preferred embodiment), a signal is sent to reset footstep counter 106. Thus, only those disturbances which meet the criteria of T1, T2, and T3 are accepted as footsteps. Footstep counter 106 will provide an output signal when a predetermined number of footsteps are recorded.

Figure 2:
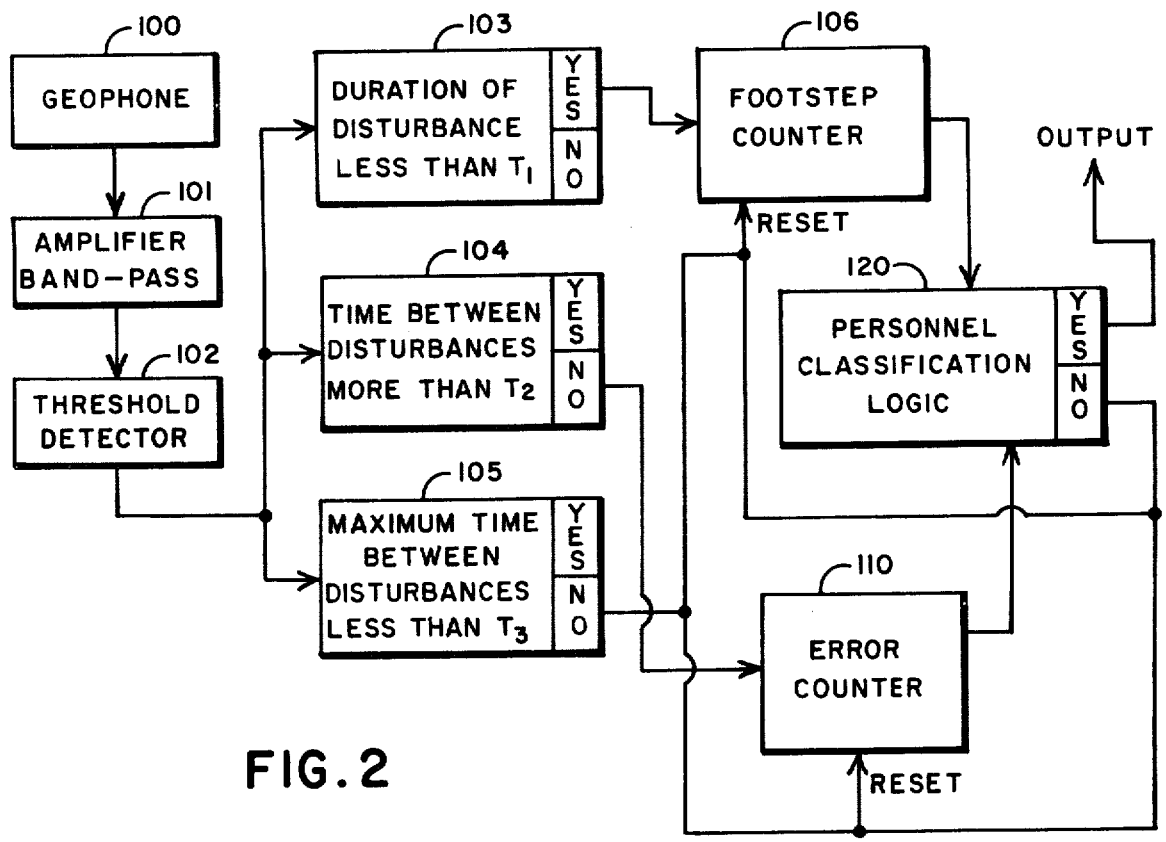
FIG. 2 is a schematic block diagram illustrating an alternate embodiment of a seismic human footstep detector according to the present invention.

FIG. 2 illustrates an alternative embodiment, which includes an error counter 110 and a personnel classification logic 120. The disturbances which do not meet the criteria of T2 are recorded as errors in error counter 110. The decision as to whether the disturbances are caused by a walking human or some other source is made by personnel classification logic 120, which provides an output signal if the count in footstep counter 106 reaches a predetermined number before a predetermined number of errors are recorded in error counter 110. If the number of errors exceeds the predetermined number before the prerequisite number of footsteps are registered, a signal is sent from personnel classification logic to reset footstep counter 106 and error counter 110.

Finally, if a disturbance is not followed by another disturbance within T3 of its beginning, timing logic 105 provides a signal to reset footstep counter 106 and error counter 110. The purpose of this feature is to prevent random seismic disturbances from accumulating as footsteps and causing false alarms.

Performance capability of the personnel discrimination logic of FIG. 2 is a function of the number of footstep and error counts chosen for the decision criteria. Excellent detection of personnel, singly and in groups, has been obtained by recording seven or eight footsteps in a footstep counter before the recording of one or two errors in an error counter.

Figure 3:
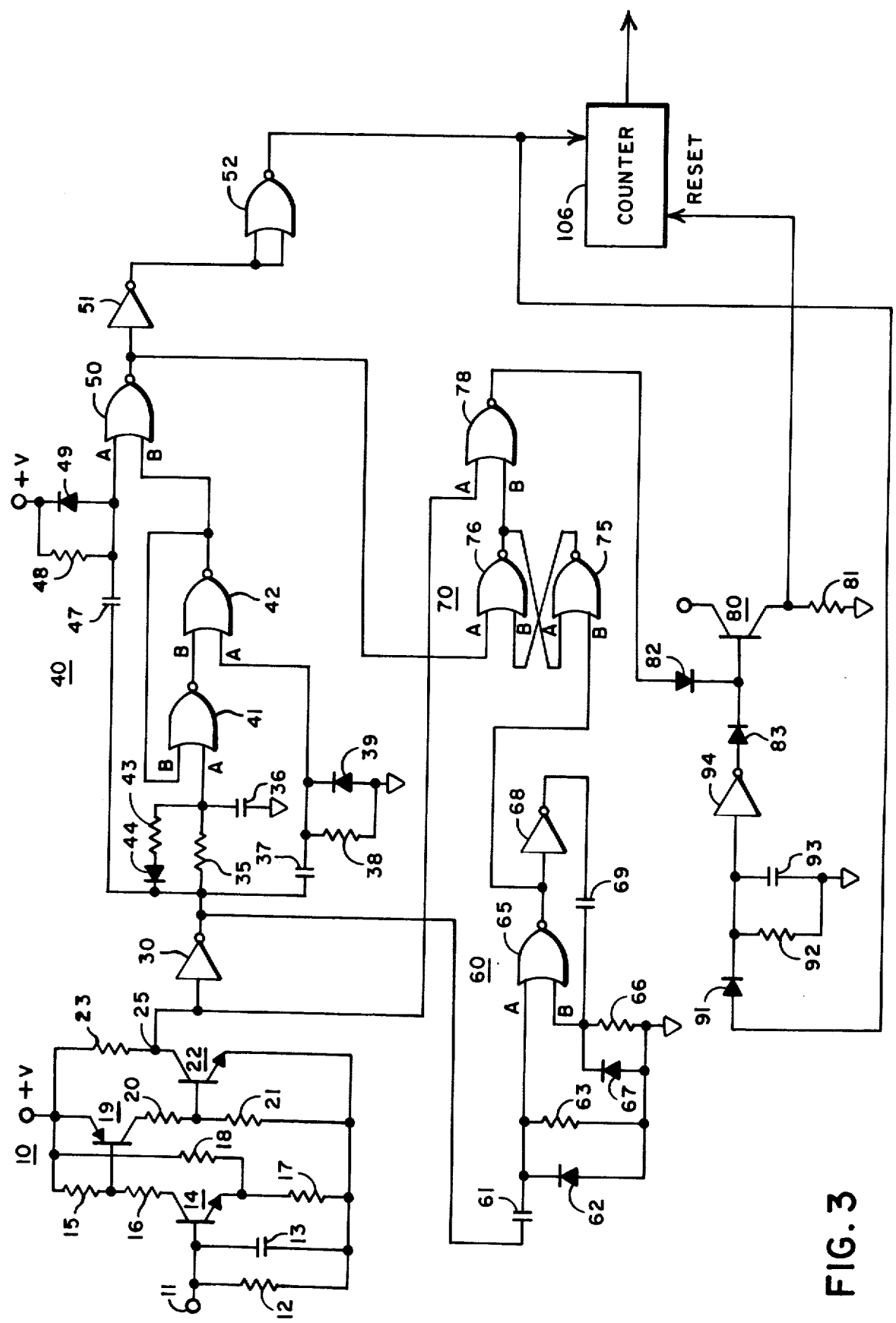
FIG. 3 is a somewhat more detailed representative of the embodiment of FIG. 1.

FIG. 3 illustrates, in somewhat more detail, the logic circuitry in accordance with the block diagram of FIG. 1. The signal from a seismic sensor such as a geophone (not shown) is amplified and applied to the input at terminal 11 of level detector 10. The function of level detector 10 is to remove the low level noise from the signal by providing a threshold and to provide at its output 25 a series of square wave pulses. The threshold is established by the voltage divider provided by the combination of resistors 17 and 18, establishing a bias level at the emitter of transistor 14. The threshold level is the sum of the bias voltage on the emitter of transistor 14 plus the forward voltage drop across the base-emitter junction of transistor 14. A positive-going signal at input terminal 11 which exceeds the threshold voltage will render transistor 14 conductive and also charge capacitor 13. The turning on of transistor 14 will lower the voltage on the base of transistor 19, causing it to conduct. This in turn will result in the raising of the potential at the base of transistor 22, causing it to conduct also and producing at the emitter of transistor 22 and output terminal 25 a negative-going signal. When no signal is present at input 11 of level detector 10, the voltage at output terminal 25 will normally be high near the positive bias voltage. A positive-going pulse at the input of level detector 10 will result in a corresponding negative-going pulse at its output. The high gain of level detector 10, together with the smoothing effect of capacitor 13 at the base of transistor 14, functions to detect the envelope of a footstep disturbance and to produce at output 25 a single constant amplitude pulse extending the entire duration of the footstep.

The output from level detector 10 is applied to several points in the logic circuit. First, it is applied through an inverter 30 to the input of a set-reset flip-flop circuit 40 comprised of NOR gates 41 and 42. Flip-flop 40 is arranged to act as a timer. This is accomplished by the delay introduced through the combination of resistor 35 and capacitor 36. The signal from the output of inverter 30 is applied to the first input of NOR gate 41 through resistor 35. The first input of NOR gate 41 is further connected to ground terminal through capacitor 36. In the preferred embodiment, resistor 35 and capacitor 36 are selected to produce a 250 millisecond delay.

The negative-going signal at the output of level detector 10 is inverted by inverter 30, producing a positive-going signal at the input of flip-flop 40. The leading edge of the positive-going signal is differentiated via capacitor 37 and applied to the first input of NOR gate 42. A high at the first input of NOR gate 42 results in a low at its output which in turn results in a low at the second input of NOR gate 41 and a high at the output of NOR gate 41, and therefore a high at the second input of NOR gate 42, thus maintaining flip-flop 40 in a set condition so long as the signal in the first input of NOR gate 41 remains low. By the action of the delay established by resistor 35 and capacitor 36, the first input to NOR gate 41 will remain low as long as no pulse appearing at the output of level detector 10 exceeds the predetermined length of time (250 milliseconds in the preferred embodiment). If a pulse should exceed the predetermined length of time, the first input of NOR gate 41 will go high, dropping the output of gate 41 low and the second input of NOR gate 42 to low. At the same time, the first input of gate 42 will also be low, resulting in a high at the output of gate 42 and the second input of gate 41. The high at the second input of gate 41 will maintain its output low, thereby clamping the flip-flop in its reset state and providing a high to input B of NOR gate 50.

The signal from the output of inverter 30 is further passed through a negative edge differentiator comprised of capacitor 47, resistor 48, and diode 49 to input A of NOR gate 50. Input A of NOR gate 40 is normally maintained high through diode 49 and the positive potential terminal. If the duration of the pulse coming from level detector 10 is less than the predetermined time delay period of flip-flop 40, input B to NOR gate 50 will still be low at the time when a negative-going pulse is applied to input A, thus resulting in a momentary high at the output of gate 50 registering the count in counter 106. If, on the other hand, operation of the pulse exceeds the predetermined delay period, input B to NOR gate 50 will already be high by the time the differentiated pulse produced by the trailing edge of the signal arrives at input A. The high at input B will disable the operation of NOR gate 50, thereby preventing the registering of a disturbance as a footstep if it exceeds the predetermined period of time in duration.

The inverted output of level detector 10 is further applied to the input of a monostable flip-flop 60 which functions as a timer of a second predetermined time period. This second predetermined time period is a sum of maximum width of a footstep generated disturbance and the minimum dead time between successive footsteps. In the preferred embodiment, the second predetermined time period is selected at 320 milliseconds.

The signal applied to the input of monostable flip-flop 60 is passed through leading edge differentiator comprised of capacitor 61, diode 62, and resistor 63. Only the positive going leading edge will result in a momentary high at input A of NOR gate 65, which is normally maintained low through resistor 63 to ground. Input B of NOR gate 65 is also maintained normally low through resistor 66 to ground. Application of a high signal at input A of NOR gate 65 results in a low at its output, which is connected to the input of an inverter 68, whose output is in turn connected through a capacitor 69 back to input B of NOR gate 65. Thus, a momentary high at input A of NOR gate 65 results in a low in its output and a high in the output of inverter 68, and therefore a high at input B of inverter 65, which in turn holds the output of NOR gate 65 low. This condition will maintain until capacitor 69 is charged up through resistor 66, whereupon input B of NOR gate 65 will drop low and since input A will already be low, the output will go back to high. The parameters of capacitor 69 and resistor 66 are selected such that they result in a second predetermined time period (320 milliseconds in the preferred embodiment).

The output of monostable flip-flop 60 is taken at the output of NOR gate 65 and is applied to input B of a NOR gate 75. NOR gate 75, together with NOR gate 76, comprise set-reset flip-flop circuit 70. NOR gate 76 receives at its input A the signal from the output of NOR gate 50, discussed previously. During the quiescent state of the circuit operation, the input B to NOR gate 75 will be normally high and input A to NOR gate 76 will be normally low. The high at input B of NOR gate 75 will maintain a low at its output, which is connected directly to input B of NOR gate 76. Thus, both inputs A and B at NOR gate 76 will be normally low and its output will be normally high. The output of NOR gate 76 is connected directly to input A of NOR gate 75 and its high will maintain the output of NOR gate 75 low.

The output of flip-flop 70 is taken at the output of NOR gate 76 and is applied to input B of a NOR gate 78. Input A of NOR gate 78 receives the uninverted output of level detector 10. Input A of NOR gate 78 will also be normally high, but will be maintained low whenever a signal is produced by level detector 10, for the entire duration of the signal.

Upon appearance of a pulse at the output of level detector 10, the monostable flip-flop timer 60 is initiated and its normally high output is dropped to a low and will be maintained low for a minimum of the second predetermined time period (320 milliseconds). The appearance of the low signal at input B of NOR gate 75, however, will have no effect on the operation of flip-flop 70 so long as input A of NOR gate 75 is maintained high and it will be maintained high until a high is received from the output of NOR gate 50 at input A of NOR gate 76. A high will be generated at the output of NOR gate 50 only if the pulse generated at the output of level detector 10 does not exceed the first predetermined time period (250 milliseconds). If in fact such a signal does appear, a high will be produced at the output of NOR gate 50 and input A of NOR gate 76, resulting in a low at the output of NOR gate 76 and input A of NOR gate 75. The second predetermined time period exceeds the first predetermined time period and, therefore, under these conditions both inputs A and B to NOR gate 75 will be low, thereby resulting in a high at its output and input B of NOR gate 76. A low now appears at input B of NOR gate 78, but since the pulse at the output of level detector 10 is no longer present, input A to NOR gate 78 is back to high, thus disabling the operation of NOR gate 78.

If the output of level detector 10 switches low again before the second predetermined time period (320 milliseconds) has expired, the output of NOR gate 78 will switch high. This occurs because input B of NOR gate 78 is still low. If the output of level detector 10 switches low after the second predetermined time period (320 milliseconds) has expired, the operation of NOR gate 78 will be disabled and NOR gate 78 output will remain low. This will occur because when monostable flip-flop timer 60 times out, the output of NOR gate 65 will go high and apply a high to the B input of NOR gate 75. A high at the B input of NOR gate 75 will cause the output of 75 to go low and apply a low to input B of NOR gate 76. The two lows on the inputs to NOR gate 76 will cause its output to go high and apply a high to input B of NOR gate 78, thus disabling the operation of NOR gate 78.

If the width of the pulse at the output of level detector 10 exceeds the first predetermined period, the output of NOR gate 50 will remain low throughout. Since NOR gate 50 remains low flip-flop 70 will remain in the set condition. Although the output of monostable flip-flop 60 will provide a low to input B of NOR gate 75 for the second predetermined time period, input A of NOR gate 75 will remain high thus holding the output of NOR gate 75 low. Since under these conditions NOR gate 75 is not allowed to change states, the output of NOR gate 76 will remain high. This applies a high to input B of NOR gate 78 holding the output of NOR gate 78 low. Thus when the pulse at level detector 10 exceeds the first predetermined time period, the counter is neither reset nor incremented.

The output of NOR gate 78 is applied to the input of a reset circuit comprised of a transistor 80, resistor 81, diode 82, and diode 83. A high signal at the output of NOR gate 78 results in the conduction of transistor 80, which in turn applies a reset signal to counter 106. Thus, whenever the time between the leading edges of the operation of level detector 10 is less than 320 milliseconds, the footstep counter 106 is reset to zero.

A further criteria to be considered is that successive footsteps will generally occur within a predetermined period of time. For example, it has been found that the second footstep will follow the first well within 1.6 seconds. Thus, a disturbance which may otherwise satisfy the criteria of a footstep, will be rejected unless it is followed by a second such disturbance within a third predetermined period of time (1.6 seconds in the preferred embodiment). To accomplish this, the signal is taken from the input of counter 106 and applied to the input of the reset circuit through a 1.6 second delay network comprised of diode 91, resistor 92, capacitor 93, and inverter 94. So long as successive footsteps are registered at the input of counter 106 within the third predetermined time period, the delay circuit acts to prevent the generation of a reset signal. If the time between successive pulses exceeds the third predetermined time period, a reset signal is generated, resetting counter 106.

We claim:
1. A seismic apparatus for detecting and identifying seismic disturbances caused by human footsteps, said apparatus comprising:
    a seismic sensor for detecting seismic disturbances, and for providing at its output electrical pulses corresponding to said seismic disturbances;
    a first timing means for receiving said pulses from said seismic sensor and providing a signal at its output whenever the duration of a pulse does not exceed a first predetermined time period;

a second timing means for receiving said pulses from said seismic sensor and providing a signal at its output whenever the time separation between successive pulses does not exceed a second predetermined time period;

a third timing means for receiving said pulses from said seismic sensor and providing a signal at its output whenever the time separation between successive pulses is greater than a third predetermined time period; and signal processing means for receiving signals from said first, second, and third timing means, and, in response thereto, providing at its output a signal representing a valid footstep.

2. Apparatus according to claim 1, wherein said seismic sensor is a geophone.

3. Apparatus according to claim 1 wherein a footstep counter is provided for accumulating signals from said first timing means and providing an output upon accumulation of a predetermined number of signals.

4. Apparatus according to claim 1 wherein said first predetermined time period is 250 milliseconds, said second predetermined time period is 320 milliseconds, and said third predetermined time period is 1,6 seconds.

* * * * *